United States Patent
Matsuo et al.

(10) Patent No.: US 11,708,902 B2
(45) Date of Patent: Jul. 25, 2023

(54) DRIVE APPARATUS

(71) Applicant: Nidec Corporation, Kyoto (JP)

(72) Inventors: Hideaki Matsuo, Kyoto (JP); Shuhei Nakamatsu, Kyoto (JP); Tsubasa Tamura, Kyoto (JP); Keisuke Aso, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/539,326

(22) Filed: Dec. 1, 2021

(65) Prior Publication Data

US 2022/0178442 A1 Jun. 9, 2022

Related U.S. Application Data

(60) Provisional application No. 63/120,835, filed on Dec. 3, 2020.

(30) Foreign Application Priority Data

Mar. 31, 2021 (JP) .............................. JP2021-059123

(51) Int. Cl.
*F16H 63/34* (2006.01)

(52) U.S. Cl.
CPC ..... *F16H 63/3433* (2013.01); *F16H 63/3458* (2013.01)

(58) Field of Classification Search
CPC .... F16H 1/06; F16H 63/3458; F16H 63/3433; F16H 63/3441
See application file for complete search history.

(56) References Cited

U.S. PATENT DOCUMENTS

| 2019/0107196 A1 | 4/2019 | Banshoya et al. | |
| 2020/0040992 A1* | 2/2020 | Tamura | F16H 63/3425 |
| 2021/0332877 A1* | 10/2021 | Li | F16H 63/3466 |
| 2021/0394601 A1* | 12/2021 | Führer | B60K 17/08 |

FOREIGN PATENT DOCUMENTS

| CN | 111677831 A | * | 9/2020 | ......... F16H 37/0813 |
| JP | 2019-158078 A | | 9/2019 | |
| JP | 2020-139579 A | | 9/2020 | |

* cited by examiner

*Primary Examiner* — Lori Wu

(74) *Attorney, Agent, or Firm* — Keating & Bennett

(57) ABSTRACT

A drive apparatus includes a power assembly rotatable about a first axis, a transmission to transmit power of the power assembly, and a parking assembly provided in the transmission. The transmission includes a first gear rotatable around a first axis, a second gear to mesh with the first gear and rotatable around a second axis, a third gear to rotate around the second axis together with the second gear, and a fourth gear to mesh with the third gear and rotatable around a third axis. The parking assembly includes a parking gear rotatable around the first axis together with the first gear, a parking pawl that includes a meshing portion and is rotatable around a fourth axis, and a drive assembly to rotationally move the parking pawl around the fourth axis and operate the parking pawl.

6 Claims, 6 Drawing Sheets

DRIVE APPARATUS

CROSS-REFERENCE TO RELATED APPLICATIONS

The present application claims priority under 35 U.S.C. § 119 to U.S. Patent Application No. 63/120,835, filed on Dec. 3, 2020, and Japanese Patent Application No. 2021-059123, filed on Mar. 31, 2021, the entire contents of which are hereby incorporated herein by reference.

FIELD OF THE INVENTION

The present disclosure relates to a drive apparatus.

BACKGROUND

A parking assembly is mounted on a drive apparatus that drives a vehicle. A conventional parking assembly pushes a parking pawl toward a parking gear side by moving a cam with a parking rod to lock the parking gear and the parking pawl.

In recent years, downsizing of a drive apparatus has been progressing. Therefore, it is conceivable to downsize the drive apparatus by devising the arrangement of a parking assembly.

SUMMARY

An example embodiment of a drive apparatus of the present disclosure includes a power assembly rotatable about a first axis, a transmission to transmit power of the power assembly, and a parking assembly provided in the transmission. The transmission includes a first gear rotatable around the first axis, a second gear to mesh with the first gear and is rotatable around a second axis parallel to the first axis, a third gear rotatable around the second axis together with the second gear, and a fourth gear to mesh with the third gear and is rotatable around a third axis parallel to the first axis. The parking assembly includes a parking gear rotatable around the first axis together with the first gear, a parking pawl that includes a meshing portion and is rotatable around a fourth axis parallel to the first axis, and a drive assembly to rotationally move the parking pawl around the fourth axis and operate the parking pawl between a locked state in which the meshing portion meshes with the parking gear and an unlocked state in which the meshing portion is separated from the parking gear. The parking gear overlaps the third gear when viewed from a radial direction, and overlaps the second gear when viewed from an axial direction.

The above and other elements, features, steps, characteristics and advantages of the present disclosure will become more apparent from the following detailed description of the example embodiments with reference to the attached drawings.

DETAILED DESCRIPTION

In description below, a vertical direction is defined based on a positional relationship when a drive apparatus 1 of the present example embodiment is mounted on a vehicle not illustrated positioned on a horizontal road surface. Further, the drawings illustrate an XYZ coordinate system as a three-dimensional orthogonal coordinate system as appropriate.

In each diagram, a Z-axis direction corresponds to the vertical direction. A +Z side is an upper side in the vertical direction, and a −Z side is a lower side in the vertical direction. In the present example embodiment, the upper side in the vertical direction will be referred to simply as the "upper side" and the lower side in the vertical direction will be simply referred to as the "lower side". An X-axis direction is a direction orthogonal to the Z-axis direction and is a vehicle front-rear direction on which the drive apparatus 1 is mounted. In the present example embodiment, a +X side is a front side of the vehicle, and a −X side is a rear side of the vehicle. A Y-axis direction is a direction orthogonal to both the X-axis direction and the Z-axis direction, and is a left-right direction of the vehicle, that is, a vehicle width direction. In the present example embodiment, a +Y side is a left side of the vehicle, and a −Y side is a right side of the vehicle. The Y-axis direction corresponds to an axial direction of a first axis J1 to be described later. The vehicle front-rear direction and the right-left direction are horizontal directions orthogonal to the vertical direction. In the present example embodiment, the +Y side corresponds to a first side in the axial direction, and the −Y side corresponds to a second side in the axial direction. The first axis J1 illustrated as appropriate in each diagram extends in the Y-axis direction, that is, the left-right direction of the vehicle.

Figure 1:
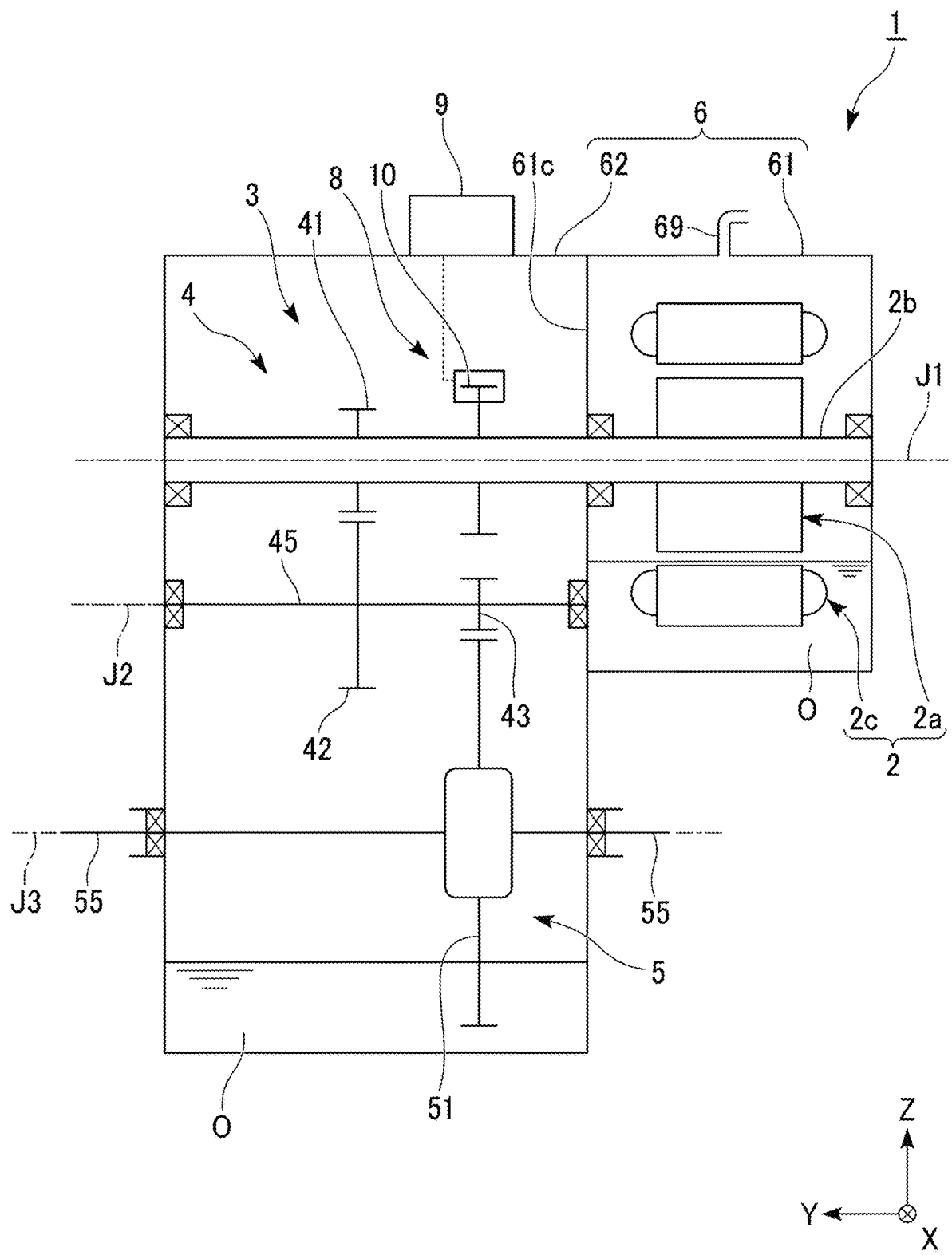
FIG. 1 is a diagram schematically illustrating a drive apparatus according to an example embodiment of the present disclosure.

FIG. 1 is a conceptual diagram schematically illustrating the drive apparatus 1. The drive apparatus 1 according to the present example embodiment is mounted in a vehicle having a motor as a power source, such as a hybrid vehicle (HEV), a plug-in hybrid vehicle (PHV), and an electric vehicle (EV), and is used as a power source of the vehicle.

The drive apparatus 1 includes a motor (power assembly) 2, a gear unit (transmission) 3 including a speed-reduction device 4 and a differential 5, a parking assembly 8, a housing 6, and oil O. The motor 2 drives the vehicle. The gear unit 3 is connected to the motor 2. The parking assembly 8 is attached to the gear unit 3.

The housing 6 includes a motor accommodation portion 61 that accommodates the motor 2, a gear accommodation portion 62 that accommodates the gear unit 3 and the parking assembly 8, and a partition 61c provided between the motor accommodation portion 61 and the gear accommodation portion 62.

The oil O is stored in the gear accommodation portion 62. The oil O is scraped up by the gear unit 3 to improve the lubricity of a tooth surface of the gear unit 3. Further, the oil O may be supplied to the motor 2. In this case, the oil O cools the motor.

A catch tank (not illustrated) that receives oil scraped up by the gear unit 3 may be provided on an inner wall portion of the gear accommodation portion 62. In this case, a flow path for guiding the received oil to each portion in the housing 6 is connected to the catch tank. The catch tank opens upward in a gravity direction. For this reason, the posture of the drive apparatus 1 with respect to the gravity direction during use can be checked based on an opening direction of the catch tank.

The motor accommodation portion 61 is provided with a breather device 69. That is, the housing 6 has the breather device 69. The breather device 69 allows the inside and the outside of the housing 6 to communicate with each other. The breather device 69 is provided on the upper side in the gravity direction. In this manner, the oil O can be prevented from leaking from the breather device 69. The posture of the drive apparatus 1 with respect to the gravity direction during use can be checked based on the arrangement of the breather device 69.

The motor 2 rotates about the first axis J1 extending along a horizontal plane. The motor 2 includes a rotor 2a and a stator 2c. In the present example embodiment, the motor 2 is an inner rotor motor. Therefore, the stator 2c surrounds the radially outer side of the rotor 2a. The rotor 2a rotates about the first axis J1 extending in the horizontal direction. The rotor 2a has a motor shaft 2b extending along the axial direction about the first axis J1.

The motor shaft 2b rotates about the first axis J1. The motor shaft 2b extends across the motor accommodation portion 61 and the gear accommodation portion 62 of the housing 6. An end portion on the left side of the motor shaft 2b projects into the inside of the gear accommodation portion 62. A first gear 41 of the gear unit 3 is fixed to the end portion on the left side of the motor shaft 2b.

The gear unit 3 is accommodated in the gear accommodation portion 62 of the housing 6. The gear unit 3 is connected to the motor 2. More specifically, the gear unit 3 is connected on one side in the axial direction of the motor shaft 2b. The gear unit 3 transmits power of the motor 2. The gear unit 3 has the speed-reduction device 4 and the differential 5.

The speed-reduction device 4 is connected to the motor 2. The speed-reduction device 4 increases the torque output from the motor 2 in accordance with a reduction ratio while reducing a rotation speed of the motor 2. The speed-reduction device 4 transmits the torque output from the motor 2 to the differential 5. The speed-reduction device 4 has the first gear 41, a second gear 42, a third gear 43, and an intermediate shaft 45. That is, the gear unit 3 has the first gear 41, the second gear 42, the third gear 43, and the intermediate shaft 45.

The first gear 41 is fixed to an end portion on the left side of the motor shaft 2b. The first gear 41 rotates around the first axis J1 together with the motor shaft 2b. The intermediate shaft 45 extends along a second axis J2 parallel to the first axis J1. The intermediate shaft 45 rotates about the second axis J2. The second gear 42 and the third gear 43 are fixed to an outer peripheral surface of the intermediate shaft 45 at intervals in the axial direction. The second gear 42 and the third gear 43 are connected to each other by the intermediate shaft 45. The second gear 42 meshes with the first gear 41. The second gear 42 rotates around the second axis J2. The third gear 43 rotates around the second axis J2 together with the second gear 42. The third gear 43 meshes with a ring gear (fourth gear) 51 of the differential 5.

The torque output from the motor 2 is transmitted to the ring gear 51 of the differential 5 through the motor shaft 2b, the first gear 41, the second gear 42, the intermediate shaft 45, and the third gear 43 in this order. A gear ratio of each gear, the number of gears, and the like of the speed-reduction device 4 can be changed as appropriate in accordance with a required reduction ratio. In the present example embodiment, the speed-reduction device 4 is a parallel axis gear type speed reducer in which axis centers of the gears are arranged in parallel.

The differential 5 is connected to the motor 2 via the speed-reduction device 4. The differential 5 is a device for transmitting the torque output from the motor 2 to a wheel of the vehicle. The differential 5 transmits the same torque to axles 55 of right and left wheels while absorbing a speed difference between the right and left wheels when the vehicle turns. The differential 5 includes the ring gear 51, a gear housing (not illustrated), a pair of pinion gears (not illustrated), a pinion shaft (not illustrated), and a pair of side gears (not illustrated). That is, the gear unit 3 has the ring gear 51. The ring gear 51 meshes with the third gear 43 and rotates around a third axis J3 parallel to the first axis J1.

Note that the axle 55 extends along a direction (that is, in the width direction of the vehicle) orthogonal to a traveling direction of the vehicle. Therefore, the traveling direction of the vehicle in a state where the drive apparatus 1 is mounted is estimated based on an extending direction of the axle 55.

The parking assembly 8 is provided on the gear unit 3 and restricts driving of the gear unit 3. The parking assembly 8 is driven by an electric actuator 9. A state of the parking assembly 8 is switched between a locked state in which the rotation of the motor shaft 2b is stopped and an unlocked state in which the rotation of the motor shaft 2b is allowed by the electric actuator 9 as a power source. The parking assembly 8 is in the locked state when the gear of the vehicle is parking, and is in the unlocked state when the gear of the vehicle is other than parking. A case where the gear of the vehicle is other than parking includes, for example, a case where the gear of the vehicle is drive, neutral, reverse, or the like.

Figure 2:
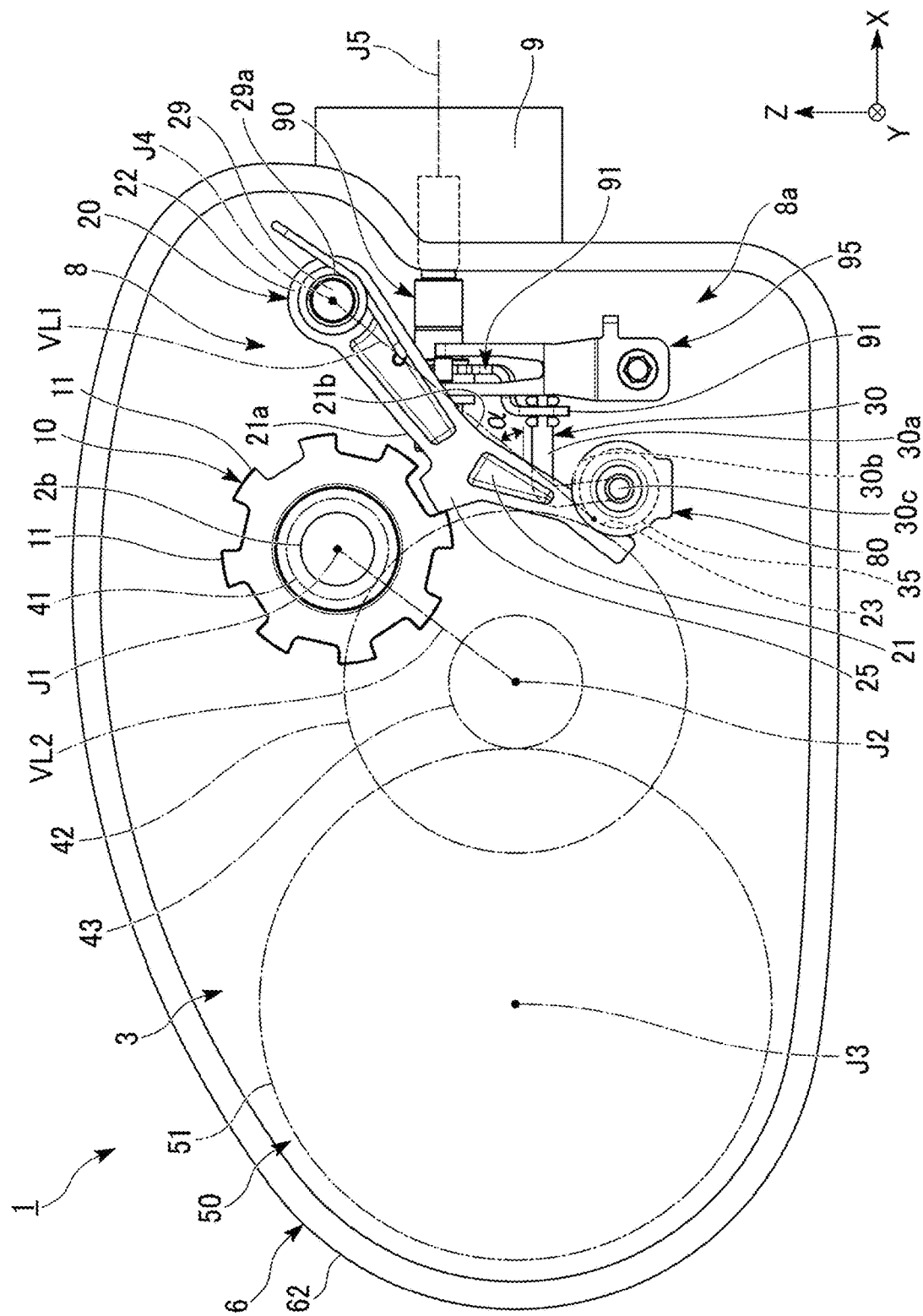
FIG. 2 is a front view of a gear unit and a parking assembly according to an example embodiment of the present disclosure.
Figure 3:
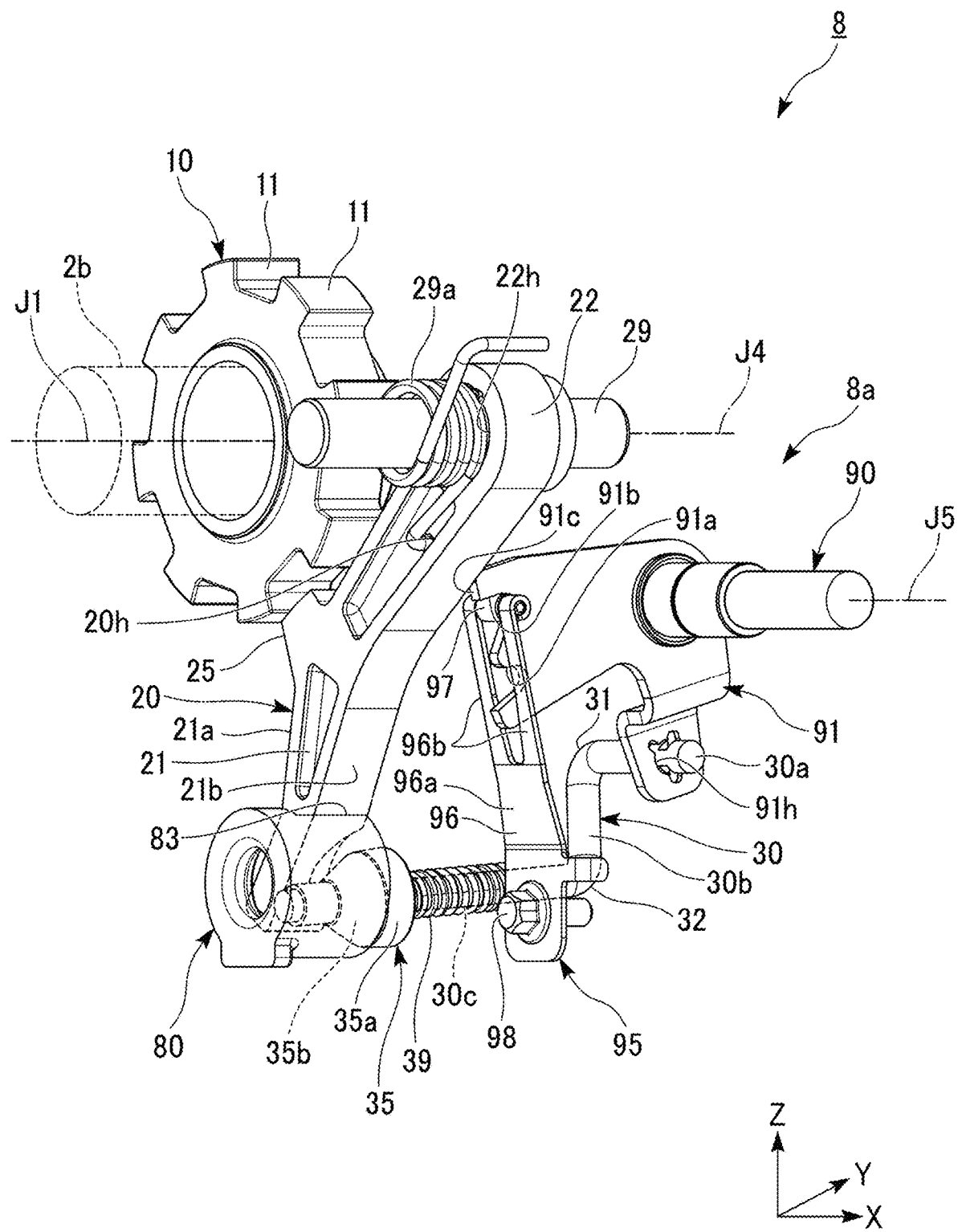
FIG. 3 is a perspective view of a parking assembly according to an example embodiment of the present disclosure.
Figure 4:
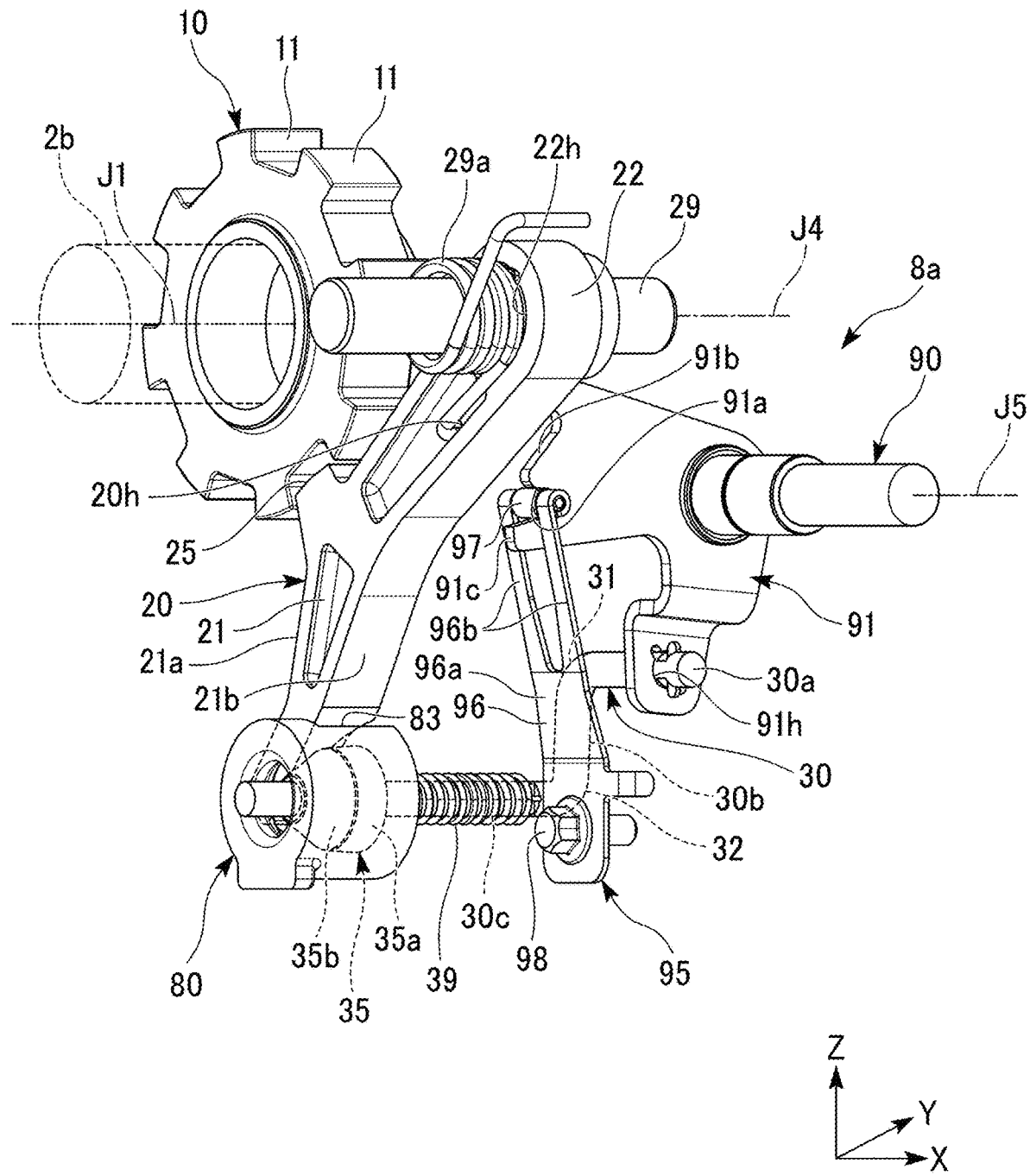
FIG. 4 is a perspective view of a parking assembly according to an example embodiment of the present disclosure, illustrating a locked state.

FIG. 2 is a front view of the gear unit 3 and the parking assembly 8. FIGS. 3 and 4 are perspective views of the parking assembly 8, where FIG. 3 shows the unlocked state and FIG. 4 shows the locked state.

As illustrated in FIGS. 3 and 4, the parking assembly 8 includes a parking gear 10, a pole shaft 29, a parking pawl 20, and a drive assembly 8a. Further, the drive assembly 8a includes a cam rod 30, a cam 35, a coil spring 39, a sleeve 80, a manual shaft 90, a flange portion 91, an elastic member 95, and the electric actuator 9.

As illustrated in FIG. 1, the parking gear 10 is fixed to an outer peripheral surface of the motor shaft 2b. The parking gear 10 is arranged between the first gear 41 and the partition 61c in the axial direction.

As illustrated in FIGS. 3 and 4, the parking gear 10 of the present example embodiment has an annular shape around the first axis J1, and is fitted to the outer peripheral surface of the motor shaft 2b. The parking gear 10 rotates together with the motor shaft 2b. That is, the parking gear 10 rotates around the first axis J1 together with the first gear 41 in conjunction with a wheel of the vehicle. A plurality of tooth portions 11 arranged in a circumferential direction are provided on an outer periphery of the parking gear 10. The tooth portion 11 projects radially outward of the first axis J1.

The pole shaft 29 extends along a fourth axis J4 parallel to the first axis J1. That is, the pole shaft 29 is a shaft parallel to the motor shaft 2b. The pole shaft 29 rotatably supports the parking pawl 20.

A winding spring 29a is mounted on the pole shaft 29. The winding spring 29a has a spring main body having a coil shape and spring end portions extending from both end portions of the spring main body. The pole shaft 29 is inserted into the spring end portion of the winding spring 29a. A first spring end portion of the winding spring 29a is hooked on a spring hooking portion (not illustrated) provided on an inner surface of the housing 6. A second spring end portion of the winding spring 29a is hooked on a spring hooking hole 20h provided on the parking pawl 20. The winding spring 29a applies an elastic force to the parking pawl 20 in a direction in which a tip is retracted toward a sleeve 80 side.

As illustrated in FIG. 2, the parking pawl 20 is arranged on a side portion of the parking gear 10. The parking pawl 20 has a plate shape whose thickness direction is the axial direction of the first axis J1. The parking pawl 20 includes a base end portion 22, a parking pawl main body portion 21 extending obliquely downward from the base end portion 22, a cam contact portion (acting portion) 23, and a meshing portion 25.

The parking pawl main body portion 21 is arranged between the parking gear 10 and the sleeve 80 when viewed from the axial direction of the first axis J1. The parking pawl main body portion 21 has a gear facing surface 21a facing a parking gear 10 side and a sleeve facing surface 21b facing the sleeve 80 side. In the present example embodiment, the meshing portion 25 is located on the gear facing surface 21a, and the cam contact portion 23 is located on the sleeve facing surface 21b. The cam contact portion 23 is located in a tip portion of the parking pawl 20. The meshing portion 25 is located between the base end portion 22 and the cam contact portion 23 in a length direction of the parking pawl 20.

As illustrated in FIGS. 3 and 4, the base end portion 22 of the parking pawl 20 is provided with a support hole 22h around the fourth axis J4. The pole shaft 29 is inserted into the support hole 22h. As a result, the parking pawl 20 is supported by the pole shaft 29 in the base end portion 22, and is rotatable around the fourth axis J4 by the pole shaft 29. That is, the parking pawl 20 is rotatable around the fourth axis J4.

The meshing portion 25 projects from the gear facing surface 21a of the parking pawl main body portion 21 toward the parking gear 10 side. The meshing portion 25 faces the tooth portion 11 of the parking gear 10. When the parking pawl 20 rotates around the pole shaft 29, the meshing portion 25 moves in directions of approaching and being separated from the parking gear 10.

The parking pawl 20 operates between the locked state in which the meshing portion 25 meshes with the parking gear 10 and the unlocked state in which the meshing portion 25 is separated from the parking gear 10. In the parking assembly 8 in the locked state illustrated in FIG. 4, the meshing portion 25 is fitted between the tooth portions 11 of the parking gear 10. That is, in the locked state, the meshing portion 25 meshes with the tooth portion 11 of the parking gear 10. In the parking assembly 8 in the unlocked state illustrated in FIG. 3, the meshing portion 25 is retracted radially outward of the first axis J1 from between the tooth portions 11.

As illustrated in FIGS. 3 and 4, the cam contact portion 23 is arranged on the sleeve facing surface 21b of the parking pawl main body portion 21. The cam contact portion 23 is located on the inner side of a notch portion 83 of the sleeve 80. The cam contact portion 23 functions as an acting portion that receives a force from the drive assembly 8a. The parking pawl 20 receives a force from the drive assembly 8a in the cam contact portion 23 and rotates around the fourth axis J4.

Figure 5:
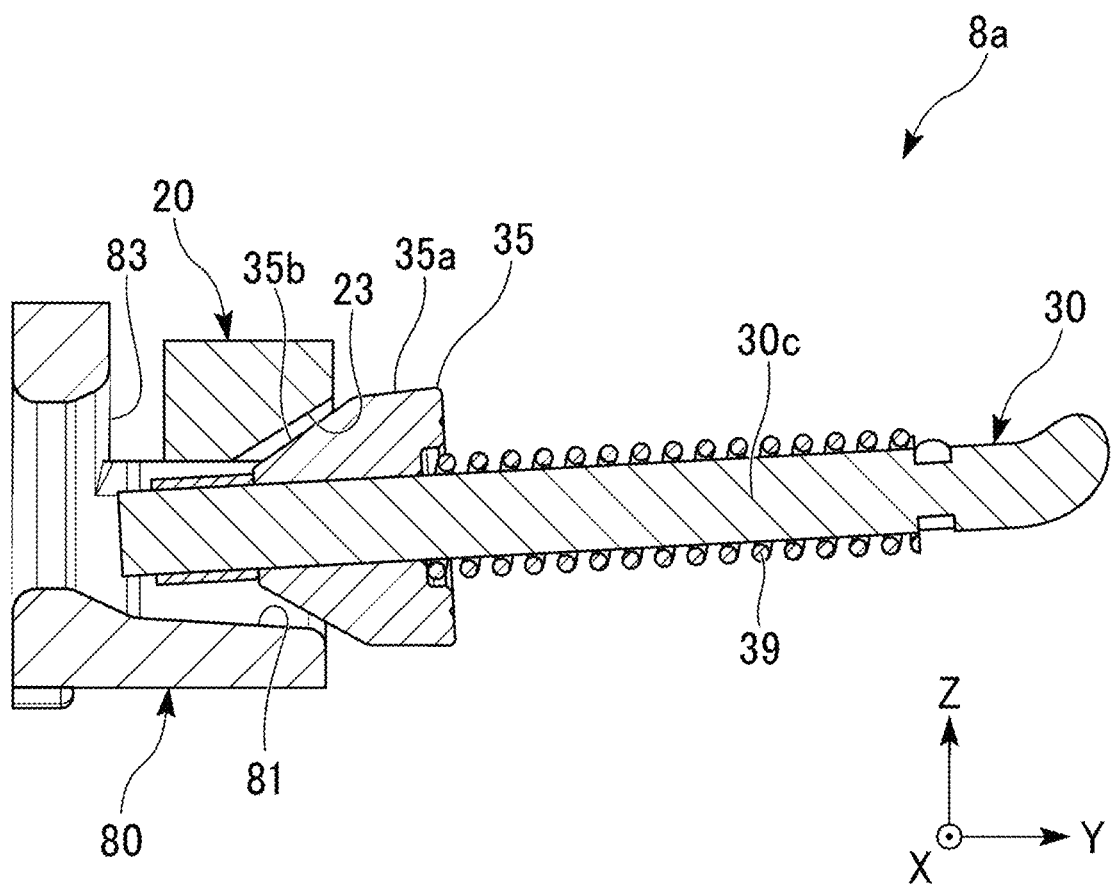
FIG. 5 is a cross-sectional view along a length direction of a cam rod of a drive assembly according to an example embodiment of the present disclosure.
Figure 6:
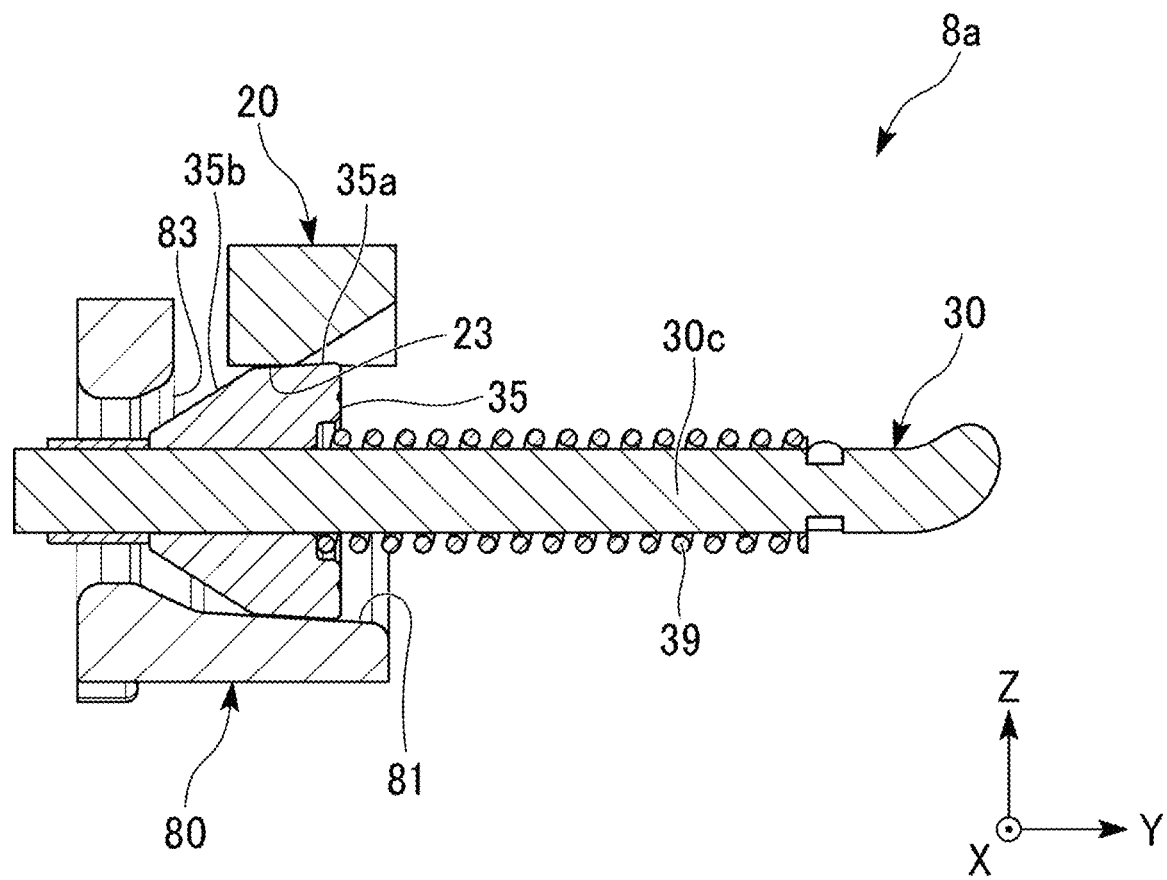
FIG. 6 is a cross-sectional view along a length direction of a cam rod of a drive assembly according to an example embodiment of the present disclosure, illustrating the locked state.

FIGS. 5 and 6 are cross-sectional views of the drive assembly 8a and the cam contact portion 23 along a length direction of a rod main body 30c. FIG. 4 illustrates the unlocked state, and FIG. 5 illustrates the locked state.

The cam contact portion 23 faces an outer peripheral surface of the cam 35. The cam contact portion 23 is separated from the outer peripheral surface of the cam 35 in the unlocked state illustrated in FIG. 4, and is in contact with the outer peripheral surface of the cam 35 in the locked state illustrated in FIG. 5. The cam contact portion 23 moves upward in accordance with operation of the cam 35 with the transition from the unlocked state to the locked state. The parking pawl 20 rotates around the fourth axis J4 with the movement of the cam contact portion 23 in the vertical direction.

When the parking pawl 20 of the present example embodiment is viewed from the axial direction of the first axis J1, the meshing portion 25 is located between the fourth axis J4 and the cam contact portion 23. Therefore, the distance between the cam contact portion 23 and the fourth axis J4 is larger than the distance between the meshing portion 25 and the fourth axis J4. According to the present example embodiment, a force for inserting the meshing portion 25 between the tooth portions 11 can be made large by a force applied from the cam 35 on the cam contact portion 23. That is, according to the present example embodiment, the meshing portion 25 can be smoothly inserted between the tooth portions 11 using the principle of leverage.

As illustrated in FIG. 2, the manual shaft 90 extends along a fifth axis J5. The fifth axis J5 is an axis extending in the vehicle front-rear direction (X-axis direction). Therefore, the manual shaft 90 extends in a direction orthogonal to the motor shaft 2b and the pole shaft 29.

The manual shaft 90 extends into and out of the housing 6. The manual shaft 90 is connected to the cam rod 30 via the flange portion 91 inside the housing 6. The manual shaft 90 is connected to the electric actuator 9 outside the housing 6. The manual shaft 90 rotates around the fifth axis J5 by the power of the electric actuator 9.

As illustrated in FIGS. 3 and 4, the flange portion 91 is fixed to an outer peripheral surface of the manual shaft 90. The flange portion 91 extends radially outward of the fifth axis J5. The flange portion 91 has a plate shape orthogonal to the fifth axis J5. The flange portion 91 rotates around the fifth axis J5 together with the manual shaft 90.

The flange portion 91 has an outer edge portion 91c facing radially outward of the fifth axis J5. The outer edge portion 91c of the flange portion 91 is provided with a first groove portion 91a and a second groove portion 91b. The first groove portion 91a and the second groove portion 91b are arranged along the circumferential direction of the fifth axis J5. The first groove portion 91a and the second groove portion 91b open radially outward of the fifth axis J5.

The flange portion 91 is provided with a connection hole 91h penetrating in the thickness direction. A connection end portion 30a of the cam rod 30 passes through the connection hole 91h. The connection end portion 30a of the cam rod 30 is rotatable about the connection hole 91h.

The elastic member 95 includes a leaf spring portion 96 and a roller 97. The leaf spring portion 96 has a plate shape with a plate surface facing the axial direction of the first axis J1. The leaf spring portion 96 extends in the vertical direction. A lower end portion of the leaf spring portion 96 is fixed to an inner surface of the housing 6 by a screw 98. An upper end portion of the leaf spring portion 96 is located on a side portion of the manual shaft 90. The upper end portion of the leaf spring portion 96 can be elastically displaced in the axial direction of the first axis J1 with the lower end portion of the leaf spring portion 96 fixed by the screw 98 as a fulcrum.

The leaf spring portion 96 has a base portion 96a and a pair of arm portions 96b. The base portion 96a is, for example, a lower portion of the leaf spring portion 96. The base portion 96a is provided with a through hole into which the screw 98 for fixing the leaf spring portion 96 to the housing 6 is inserted. The pair of arm portions 96b extend upward from an upper end portion of the base portion 96a. The pair of arm portions 96b are arranged side by side at intervals in the axial direction of the fifth axis J5.

The roller 97 is rotatable about a rotation axis extending in the axial direction of the fifth axis J5. The roller 97 is attached to the upper end portion of the leaf spring portion 96. The roller 97 has a shaft portion connecting upper end portions of the pair of arm portions 96b and a rotation portion through which the shaft portion passes. The roller 97 rotates with respect to the leaf spring portion 96 in the rotation portion. The roller 97 contacts the outer edge portion 91c of the flange portion 91. As the flange portion 91 rotates around the fifth axis J5, the roller 97 moves while rolling between the first groove portion 91a and the second groove portion 91b on the outer edge portion 91c.

The roller 97 can be fitted into the first groove portion 91a and the second groove portion 91b. In this manner, the elastic member 95 is caught by the first groove portion 91a or the second groove portion 91b, and positions the flange portion 91 around the fifth axis J5.

As illustrated in FIG. 3, the roller 97 is fitted into the second groove portion 91b in the parking assembly 8 in the unlocked state. As illustrated in FIG. 4, the roller 97 is fitted into the first groove portion 91a in the parking assembly 8 in the locked state. Further, when the state of the parking assembly 8 is switched between the locked state and the unlocked state, the roller 97 moves between the first groove portion 91a and the second groove portion 91b while the leaf spring portion 96 is elastically deformed.

The cam rod 30 has the connection end portion 30a, a joint portion 30b, and the rod main body 30c. In the cam rod 30, a first bent portion 31 is provided between the connection end portion 30a and the joint portion 30b, and a second bent portion 32 is provided between the joint portion 30b and the rod main body 30c. The cam rod 30 has a rod shape with a circular cross section bent in the first bent portion 31 and the second bent portion 32.

The connection end portion 30a extends along the axial direction of the fifth axis J5. The connection end portion 30a is inserted into the connection hole 91h of the flange portion 91. On an outer periphery of the connection end portion 30a, a protrusion that suppresses detachment of the connection end portion 30a from the connection hole 91h is provided. The cam rod 30 is connected to the manual shaft 90 via the flange portion 91 in the connection end portion 30a. As described above, the manual shaft 90 is connected to the electric actuator 9 and rotates around the fifth axis J5. The cam rod 30 is driven along the axial direction of the first axis J1 by the manual shaft 90.

The rod main body 30c extends along the axial direction of the first axis J1. The rod main body 30c extends in a direction orthogonal to the connection end portion 30a. Further, the rod main body 30c extends in a direction orthogonal to the axial direction of the manual shaft 90 (the axial direction of the fifth axis J5). The rod main body 30c passes through the inside of the sleeve 80. The rod main body 30c is guided by the sleeve 80. Further, the cam rod 30 moves along the axial direction of the first axis J1 with the rotation along the fifth axis J5 of the flange portion 91.

The joint portion 30b extends along the vertical direction. An upper end of the joint portion 30b is connected to the connection end portion 30a. Further, a lower end of the joint portion 30b is connected to the rod main body 30c. The joint portion 30b connects the connection end portion 30a and the rod main body 30c.

As illustrated in FIG. 2, the joint portion 30b extends toward a first axis J1 side as viewed in the axial direction of the first axis J1. The joint portion 30b is provided to shift relative positions in the vertical direction between the connection end portion 30a and the rod main body 30c. By arranging the joint portion 30b so as to extend toward the first axis J1 side, the connection end portion 30a can be arranged close to the first axis J1 side with respect to the rod main body 30c. For this reason, while the cam 35 supported by the rod main body 30c is arranged at an optimum position, the flange portion 91 connected to the connection end portion 30a, the manual shaft 90, the electric actuator, and the like can be arranged close to the first axis J1 side. In this manner, portions of the parking assembly 8 can be densely arranged around the first axis J1, and the arrangement space of the parking assembly 8 in the drive apparatus 1 can be reduced.

As illustrated in FIGS. 3 and 4, the coil spring 39 and the cam 35 pass through the rod main body 30c. That is, the rod main body 30c supports the coil spring 39 and the cam 35. In the rod main body 30c, an end portion connected to the joint portion 30b is defined as a base end, and an end portion on the opposite side to the base end is defined as a tip. The coil spring 39 is arranged on a base end side of the rod main body 30c with respect to the cam 35. A protrusion larger than an inner diameter of the coil spring 39 is provided on an outer periphery of the base end of the rod main body 30c. The coil spring 39 is arranged between the projection and the cam 35 in a compressed state with respect to a natural length. The coil spring 39 applies a force toward a tip side of the rod main body 30c to the cam 35.

As illustrated in FIG. 3, the cam 35 has an annular shape around the rod main body 30c. The rod main body 30c is inserted into a through hole at the center of the cam 35. An inner diameter of the through hole of the cam 35 is larger than an outer diameter of the rod main body 30c. A retaining cap (not illustrated) is attached to the tip of the rod main body 30c. The retaining cap prevents the cam 35 from falling off the tip of the rod main body 30c. The cam 35 is in contact with the coil spring 39 on the base end side of the rod main body 30c. The coil spring 39 is compressed as the cam 35 moves toward the base end side. The cam 35 moves to the base end side with respect to the rod main body 30c when receiving a force toward the base end side larger than a repulsive force of the coil spring 39.

The cam 35 is in contact with the cam contact portion 23 of the parking pawl 20 on the outer peripheral surface. A first conical surface 35a and a second conical surface 35b are provided on the outer peripheral surface of the cam 35. The first conical surface 35a and the second conical surface 35b are coaxially arranged. Each of the first conical surface 35a and the second conical surface 35*b* is a conical tapered surface whose outer diameter gradually decreases from the base end side toward the tip side of the rod main body 30*c*. The second conical surface 35*b* is located on the tip side with respect to the first conical surface 35*a*. A taper angle of the first conical surface 35*a* is sufficiently smaller than a taper angle of the second conical surface 35*b*. The taper angle of the second conical surface 35*b* is set to an angle sufficient for the cam 35 to be smoothly detached from between the sleeve 80 and the cam contact portion 23 at the time of transition from the locked state to the unlocked state. Note that the first conical surface 35*a* may be a cylindrical surface having a columnar shape instead of a conical shape.

As illustrated in FIGS. 5 and 6, the cam 35 is attached to the cam rod 30 and moves along the length direction of the rod main body 30*c* together with the cam rod 30. Further, the cam 35 is in contact with the cam contact portion 23 of the parking pawl on the outer peripheral surface. The cam 35 moves with operation of the cam rod 30 to operate the parking pawl 20.

As illustrated in FIG. 5, in the parking assembly 8 in the unlocked state, the second conical surface 35*b* of the cam 35 faces the cam contact portion 23 of the parking pawl 20 with a gap interposed between them. Further, as illustrated in FIG. 6, in the parking assembly 8 in the locked state, the cam 35 contacts the cam contact portion 23 on the first conical surface 35*a*. When the state of the parking assembly 8 is switched between the locked state and the unlocked state, the cam 35 comes into contact with the cam contact portion 23 on the second conical surface 35*b* and further slides. In this manner, the cam 35 moves the cam contact portion 23 upward and rotates the parking pawl 20 around the fourth axis J4.

The sleeve 80 has a tubular shape surrounding the rod main body 30*c*. The sleeve 80 is provided with the notch portion 83 that opens a part of an inner surface 81 radially outward. The sleeve 80 is fixed to an inner surface of the housing 6. The sleeve 80 guides operation of the rod main body 30*c* and the cam 35.

As illustrated in FIG. 3, the parking pawl 20 in the unlocked state comes into contact with an edge portion of the notch portion 83 of the sleeve 80 on the sleeve facing surface 21*b*. In the unlocked state, the parking pawl 20 contacts the sleeve 80 and is supported by the sleeve 80 from below. In the parking assembly 8 in the unlocked state, the sleeve 80 comes into contact with the parking pawl 20 to limit the range of rotational movement of the parking pawl 20.

Next, a function and an effect of the drive apparatus 1 of the present example embodiment will be described.

As illustrated in FIG. 1, the parking gear 10 of the present example embodiment overlaps the third gear 43 when viewed from the radial direction. By arranging the parking gear 10 in a manner overlapping the third gear 43 when viewed from the radial direction, the parking assembly 8 and the gear unit 3 can be arranged so as to overlap each other in the axial direction. That is, the parking assembly 8 can be arranged in a gap of the gear unit 3, and the drive apparatus 1 can be downsized by effectively using the internal space of the drive apparatus 1.

Further, the parking gear 10 of the present example embodiment is arranged between the motor 2 and the first gear 41 in the axial direction. That is, the parking gear 10 is arranged on a partition 61*c* side with respect to the first gear 41. For this reason, the third gear 43 and the ring gear 51 overlapping the parking gear 10 when viewed from the radial direction are also arranged close to the motor 2 in the axial direction. A gear having a largest diameter in the gear unit 3 is the ring gear 51. By arranging the ring gear 51 close to the motor 2, it is possible to downsize, in the axial direction, a region that is an accommodation space of the gear unit 3 and overlaps the ring gear 51 when viewed from the axial direction, and it is possible to downsize the drive apparatus 1.

As illustrated in FIG. 2, the parking gear 10 of the present example embodiment overlaps the second gear 42 when viewed from the axial direction of the first axis J1. In this manner, a part of the parking assembly 8 and a part of the gear unit 3 can be arranged to overlap each other in the axial direction. According to the present example embodiment, a projection area of the drive apparatus 1 in the axial direction can be reduced while a force for braking the rotation of the gear unit 3 by the parking assembly 8 is sufficiently secured by increasing the diameter of the parking gear 10.

In the present example embodiment, the parking pawl 20 in the locked state overlaps the second gear 42 when viewed from the axial direction of the first axis J1. As described above, by arranging the parking pawl 20 close to the second axis J2, it is possible to make the overlap between the parking assembly 8 and a part of the gear unit 3 large in the axial direction, and to further downsize the drive apparatus 1. Note that the parking pawl 20 may be configured to overlap the second gear 42 even in the unlocked state. In this case, further downsizing of the drive apparatus 1 can be realized.

As illustrated in FIG. 2, the first axis J1 is arranged above the second axis J2. Further, the second axis J2 and the third axis J3 are arranged at substantially the same height. Therefore, in the drive apparatus 1 of the present example embodiment, the rotation center of the motor 2 (that is, the first axis J1) is arranged above rotation centers of other gears. According to the present example embodiment, the second gear 42 is arranged below the motor 2. Therefore, the second gear 42 easily scrapes up the oil O accumulated in a lower region inside the housing 6 together with the ring gear 51.

The parking pawl 20 is arranged below the parking gear 10. The meshing portion 25 of the parking pawl 20 meshes with the parking gear 10 from below. According to the present example embodiment, an own weight of the parking pawl 20 can be used for operation of shifting the parking pawl 20 from the locked state to the unlocked state. For this reason, a spring force of the winding spring 29*a* that brings the parking pawl 20 closer to the unlock side (sleeve 80 side) can be made small, and the assemblability of the parking assembly 8 can be enhanced.

In the present example embodiment, the oil O scraped up by the ring gear 51 passes through the vehicle rear side (−X side) of the ring gear 51, the upper side of the first gear 41, the second gear 42, and the third gear 43, and is supplied to each portion of the gear unit 3. According to the present example embodiment, since the parking pawl 20 is arranged on the lower side of the parking gear 10, the parking pawl 20 hardly obstructs a scattering path of the oil O as compared with a case where the parking pawl 20 is arranged on the upper side. For this reason, the oil O scraped up by the ring gear 51 can be spread over the entire gear unit 3.

The parking pawl 20 is arranged to be inclined obliquely upward when viewed from the axial direction of the first axis J1. As illustrated in FIG. 2, when viewed from the axial direction, a straight line connecting the fourth axis J4, which is the rotation center of the parking pawl 20, and the cam contact portion 23 is defined as a first imaginary line VL1. Further, a straight line connecting the first axis J1 and the second axis J2 when viewed from the axial direction is defined as a second imaginary line VL2. The first imaginary line VL1 and the second imaginary line VL2 are inclined toward the front of the vehicle (+X side) as the lines are closer to the upper side. The first imaginary line VL1 is inclined at about 55° with respect to the horizontal plane. Further, the second imaginary line VL2 is inclined at about 50° with respect to the horizontal plane.

According to the present example embodiment, the first imaginary line VL1 extends along the second imaginary line VL2 as viewed in the axial direction of the first axis J1. Therefore, the parking pawl 20 is arranged along the parking gear 10 and the third gear 43 while avoiding interference with the third gear 43. According to the present example embodiment, since the parking pawl 20 is arranged along the gear unit 3, a projection area of the drive apparatus 1 in the axial direction can be made small, and the drive apparatus 1 can be downsized.

In the present example embodiment, an inclination angle α of the first imaginary line VL1 with respect to the horizontal plane (X-Y plane) is preferably about 45° or more. By setting the inclination angle α to 45° or more, it is possible to suppress an increase in size of an accommodation space of the parking assembly in the vehicle front-rear direction (X-axis direction) while sufficiently lengthening the parking pawl 20.

In the present example embodiment, the inclination angle α of the first imaginary line VL1 with respect to the horizontal plane (X-Y plane) is preferably about 60° or less. By setting the inclination angle α to 60° or less, it is easy to rotationally move the parking pawl 20 toward the sleeve 80 side using an own weight of the parking pawl 20.

Although various example embodiments of the present disclosure are described above, structures in the example embodiments and a combination of the example embodiments are examples, and thus addition, elimination, replacement of structure, and other modifications can be made within a range without departing from the spirit of the present disclosure. Further, the present disclosure is not limited by the example embodiment.

For example, the power assembly of the drive apparatus 1 of the present example embodiment, which is the motor, may be an engine. Further, the structure of the gear unit (transmission) is not limited to that in the description of the present example embodiment.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A drive apparatus comprising:
a power assembly rotatable about a first axis;
a transmission to transmit power of the power assembly; and
a parking assembly provided in the transmission; wherein
the transmission includes:
a first gear rotatable around the first axis;
a second gear to mesh with the first gear and rotatable around a second axis parallel to the first axis;
a third gear rotatable around the second axis together with the second gear; and
a fourth gear to mesh with the third gear and rotatable around a third axis parallel to the first axis;
the parking assembly includes:
a parking gear rotatable around the first axis together with the first gear;
a parking pawl that includes a meshing portion and is rotatable around a fourth axis parallel to the first axis; and
a drive assembly to rotationally move the parking pawl around the fourth axis and operate the parking pawl between a locked state in which the meshing portion meshes with the parking gear and an unlocked state in which the meshing portion is separated from the parking gear;
the parking gear overlaps the third gear when viewed from a radial direction, and overlaps the second gear when viewed from an axial direction; and
the parking pawl in the locked state overlaps the second gear when viewed from the axial direction.

2. The drive apparatus according to claim 1, wherein the parking gear is between the power assembly and the first gear in the axial direction.

3. The drive apparatus according to claim 1, wherein the first axis extends along a horizontal plane above the second axis;
the parking pawl includes an acting portion to receive a force from the drive assembly;
the meshing portion is positioned to mesh with the parking gear from below; and
a first imaginary line connecting the fourth axis and the acting portion extends along a second imaginary line connecting the first axis and the second axis when viewed from the axial direction.

4. The drive apparatus according to claim 3, wherein an inclination angle of the first imaginary line with respect to the horizontal plane is in a range from 45° to 60°.

5. The drive apparatus according to claim 1, wherein the parking pawl includes an acting portion to receive a force from the drive assembly; and
the meshing portion is located between the fourth axis and the acting portion when viewed from the axial direction.

6. The drive apparatus according to claim 1, wherein the drive assembly includes:
a manual shaft that extends along a fifth axis in a direction orthogonal to the first axis and rotatable around the fifth axis;
a cam rod connected to the manual shaft; and
a cam that is attached to the cam rod and is in contact with the parking pawl to move with operation of the cam rod to operate the parking pawl;
the cam rod includes:
a rod main body to support the cam;
a connection end portion connected to the manual shaft; and
a joint portion to connect the rod main body and the connection end portion; and
the joint portion extends toward the first axis side when viewed from the axial direction.

* * * * *